United States Patent
Yang et al.

(10) Patent No.: US 7,116,349 B1
(45) Date of Patent: Oct. 3, 2006

(54) METHOD OF VIDEOPHONE DATA TRANSMISSION

(75) Inventors: Chin-Tien Yang, Hsinchu (TW); Chung-Hsi Chia, Jhonghe (TW)

(73) Assignee: Leadtek Research Inc., (TW)

( * ) Notice: Subject to any disclaimer, the term of this patent is extended or adjusted under 35 U.S.C. 154(b) by 18 days.

(21) Appl. No.: 10/907,498

(22) Filed: Apr. 4, 2005

(51) Int. Cl.
*H04N 7/14* (2006.01)

(52) U.S. Cl. .............................. 348/14.01; 348/14.02; 455/558

(58) Field of Classification Search .. 348/14.01–14.09, 348/14.1, 14.11–14.13; 713/200, 182, 201; 455/557, 558; 380/44, 45, 59
See application file for complete search history.

(56) References Cited

U.S. PATENT DOCUMENTS

| | | | |
|---|---|---|---|
| 6,230,269 B1 * | 5/2001 | Spies et al. .................. | 713/182 |
| 6,549,229 B1 * | 4/2003 | Kirby et al. ............. | 348/14.01 |
| 6,625,734 B1 * | 9/2003 | Marvit et al. ................ | 713/201 |
| 2003/0161473 A1 | 8/2003 | Fransdonk | |
| 2004/0088560 A1 * | 5/2004 | Danks ........................ | 713/200 |
| 2004/0114747 A1 * | 6/2004 | Trandal et al. .......... | 379/211.02 |
| 2004/0170259 A1 * | 9/2004 | Park ........................ | 379/88.17 |
| 2004/0179684 A1 * | 9/2004 | Appenzeller et al. .......... | 380/44 |
| 2004/0204028 A1 * | 10/2004 | Kotzin ........................ | 455/551 |
| 2005/0113137 A1 * | 5/2005 | Rodriguez et al. .......... | 455/558 |

FOREIGN PATENT DOCUMENTS

| | | |
|---|---|---|
| GB | 2 374 497 A | 10/2002 |
| JP | 2004080296 | 3/2004 |
| WO | WO-01/67267 A1 | 9/2001 |
| WO | WO-02/05476 A1 | 1/2002 |

* cited by examiner

*Primary Examiner*—Melur Ramakrishnaiah
(74) *Attorney, Agent, or Firm*—Connolly Bove Lodge & Hutz LLP; Larry J. Hume

(57) ABSTRACT

A method of videophone data transmission based on the PKI (Public Key Infrastructure) is executed with a videophone and a user. The method includes the steps of performing a connection procedure, performing a data download procedure and performing a disconnection procedure. While performing the connection procedure, a smart key, which stores at least one piece of user identification data, is connected to a videophone. The user identification data contains an ID code, a password and a private key of the user. While performing the data download procedure, the user identification data is encrypted and transmitted to a service server for verifying the user. Then, at least one service provided by the service server is encrypted and downloaded to the videophone. After decryption, the at least one service can be executed in the videophone. While performing a disconnection procedure, the smart key is disconnected from the videophone.

18 Claims, 9 Drawing Sheets

METHOD OF VIDEOPHONE DATA TRANSMISSION

BACKGROUND OF THE INVENTION

1. Field of the Invention

The present invention relates to a method of data transmission, and more particularly to a method of data transmission with a videophone as a terminal and operated with a smart key, which is suitable for transmission with confidential and/or value-added data.

2. Description of the Related Art

A videophone uses H.322, SIP or other common communication protocols to provide a high quality audio-video (AV) data transmission and is currently a developed product. A user with Ethernet and an IP address can utilize the videophone to communicate with another videophone user worldwide, face-to-face. The videophone can be applied to all IP network structures including xDSL (x Digital Subscriber Lin), cable, LAN (Local Area Network) and VPN (Virtual Private Network). Thirty real-time image frames per second can be communicated through the videophones connected to a wideband network, and therefore the applications of remote AV transmission like distance education, remote monitoring and videoconferences can be achieved by videophones. But if the verification of a user, the communication of confidential data or purchase of AV service is required, it is difficult for traditional videophones to meet these requirements.

SUMMARY OF THE INVENTION

The primary objective of the present invention is to provide a method of data transmission, and particularly a method of videophone data transmission, which is based on the PKI (Public Key Infrastructure) and utilizes the identification codes in the smart key combined with the videophone(s) to perform the transmission of confidential and/or value-added data.

The smart key, which employs the PKI, contains an ID code, a password and a private key. When connected to the videophone, the smart key passes the information (ID code, password and private key) to the videophone to login to obtain the related authorities of services and the user data like a phone book. When two users have their own videophone, they can transmit data with encryption. A sender can encrypt the AV data with a public key, and a receiver can decrypt the AV data with a private key. Also, user's personal data can be transmitted in this way without risk.

Two types of connection techniques are used in the connection between a videophone and a smart key. They are wired and wireless. A smart key can store a user-interface containing the phone book, the standby screen, the status icon and the ringing melody. In addition, the smart key can store preloaded application programs to enjoy customized functions. In general, a wired-type smart key may be equipped with larger memory, and it is particularly suitable for storage of mass data mentioned above.

In order to achieve its objective, the present invention discloses a method of videophone data transmission, which is executed via a videophone and a user. The method includes the steps of performing a connection procedure, performing a data download procedure and performing a disconnection procedure. At the step of performing the connection procedure, a smart key is used containing at least one type of user identification data (of the smart key holder), which is a user ID code, a password or at least one private key. The step of performing the data download procedure includes further encrypting the user identification data, transmitting the user identification data to a service server, verifying the user, encrypting the service provided by the service server, downloading the service to the videophone, decrypting the service and executing the service in the videophone.

In addition to accessing the service directly from the service server mentioned above, if two users have their own videophone and smart key (for example, a first user with a first smart key and a first videophone, and a second user with a second smart key and a second videophone), they can transmit the AV data with encryption between them. To establish this kind of communication, a method of videophone data transmission is disclosed as follows.

First, the first user sends a request to the second user. If the second user accepts the request, the first user encrypts a first AV data and sends the first encrypted AV data to the second videophone of the second user. Secondly, the second user decrypts the encrypted AV data with a private key stored in the second smart key. In the meantime, the second user can encrypt a second AV data and then send the second encrypted AV data to the first videophone of the first user. After receiving the second encrypted AV data, the first user can decrypt the second encrypted AV data.

BRIEF DESCRIPTION OF THE DRAWINGS

The invention will be described according to the appended drawings in which.

PREFERRED EMBODIMENT OF THE PRESENT INVENTION

Figure 1:
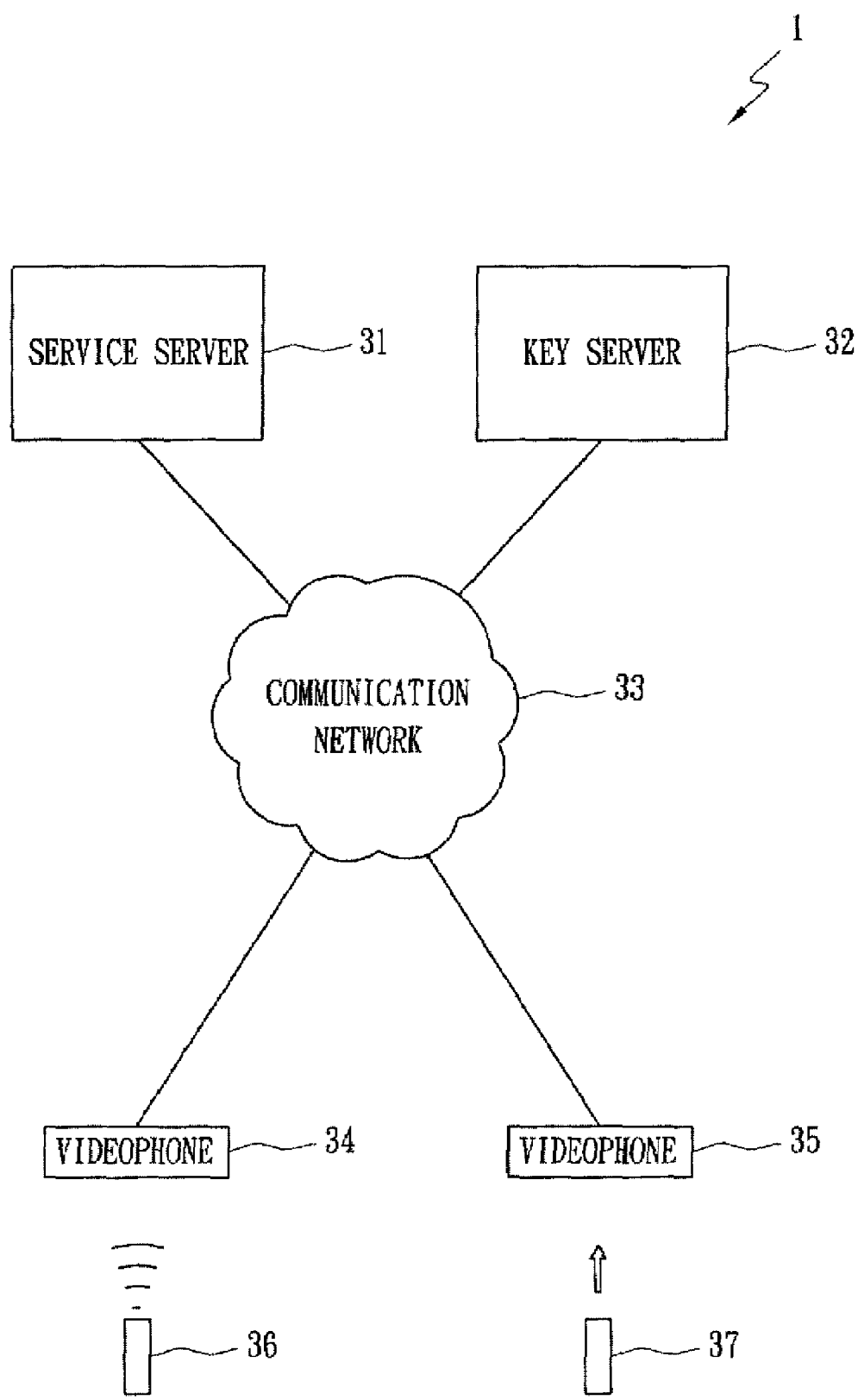
FIG. 1 is a system diagram of performing the method of videophone data transmission of the present invention.

FIG. 1 is a system diagram of performing the method of videophone data transmission of the present invention. The system includes a service server 31, a key server 32, a communication network 33, a videophone 34, another videophone 35, a first smart key 36 and a second smart key 37. The service server 31 provides some services like movie-on-demand, conference service, IP phone, Quality of Service etc., to the users of videophones 34, 35. The key server 32 provides public keys to the users on the network. The communication network 33 may be any one of the IP network structures including xDSL (x Digital Subscriber Lin), cable, LAN (Local Area Network), VPN (Virtual Private Network), Internet, ISDN (Integrated Services Digital Network) and the general telephone line. The first smart key 36 held by a first user is a memory device, which stores at least one piece of user identification data, which is an ID code, a password or a first private key of the first user. The first smart key 36 also stores a plurality of application programs, a plurality of icons and a plurality of digital photos. After the first smart key 36 is connected to the videophone 34, the application programs may be executed in the videophone 34 and the digital photos may be chosen as welcome screens. Two types of connection techniques are used in the connection between a videophone and a smart key. They are wired and wireless. The wired connection techniques include USB (Universal Serial Bus), FireWire (or IEEE 1394 interface), SD (Secure Digital) or CF (Compact Flash). The wireless connection techniques include Wi-Fi (Wireless Fidelity), Bluetooth or IR (Infra-Red). FIG. 1, the embodiment of the present invention, shows a wireless connection between the first smart key 36 and the videophone 34, and a wired connection between the second smart key 37 and the videophone 35.

Figure 2:
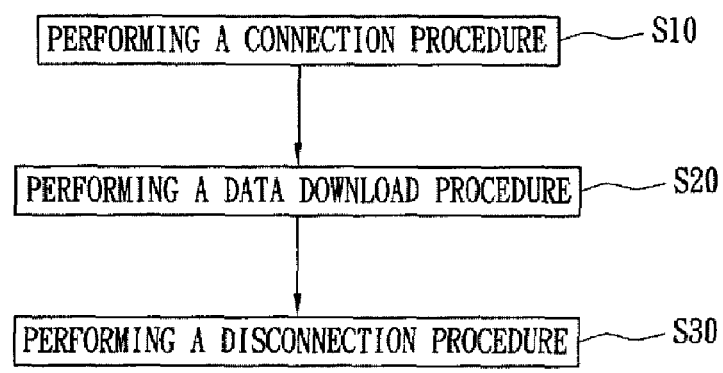
FIG. 2 is a flowchart of the method of videophone data transmission of the present invention.

FIG. 2 is a flowchart of the method of videophone data transmission of the present invention. First, the first smart key 36 is connected to the videophone 34 to establish the connection. Secondly, a data download procedure is performed (S20) to download at least one service provided by the service server 31 to the videophone 34. Finally, a disconnection procedure is performed (S30) to disconnect the first smart key 36 from the videophone 34.

Figure 3:
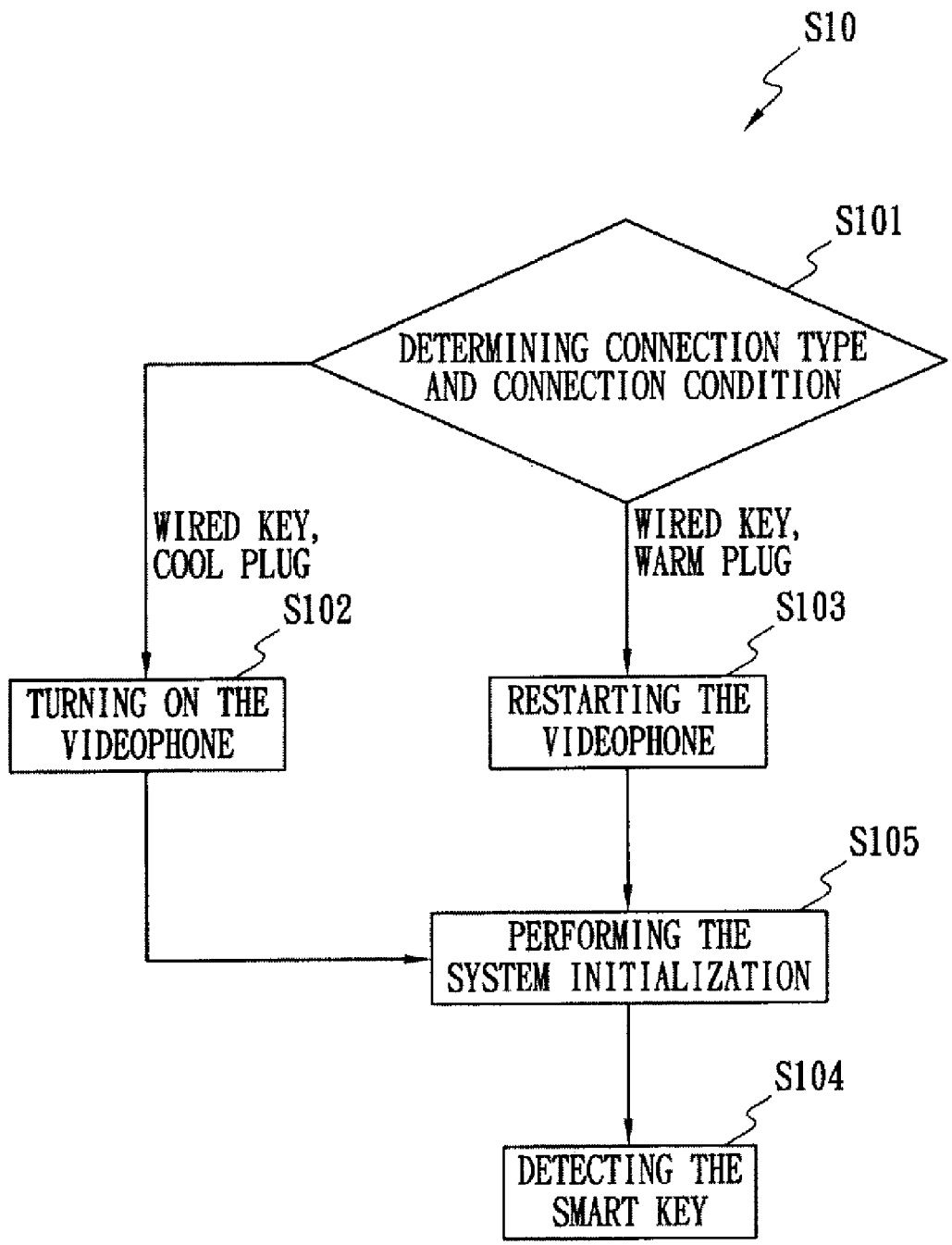
FIGS. 3 and 4 show the flowcharts of performing a connection procedure.

FIG. 3 shows the detailed flowchart of performing the connection procedure (S10) under cool plug and warm plug conditions. When the first user holds the first smart key 36 to connect to the videophone 34, the videophone 34 will determine connection types and connection conditions (S101). There are three connection conditions, cool plug, warm plug and hot plug, which are explained hereinafter. If the videophone 34 is off, the first smart key 36 is connected to the videophone 34 only by wired connection (i.e., cool plug). After connection, the first user turns on the videophone 34 (S102) to perform the system initialization (S105) to reset the parameters of the videophone 34. If the videophone 34 is already on (i.e., regular operation state) and is required to restart (when the IP address changed, for example) and the first smart key 36 is already connected to the videophone 34 (i.e. warm plug), the videophone 34 will be restarted (S103) and then perform the system initialization (S105) to reset the parameters of the videophone 34. After system initialization, detection of the first smart key (S104) is performed to confirm a proper connection is established.

Figure 4:
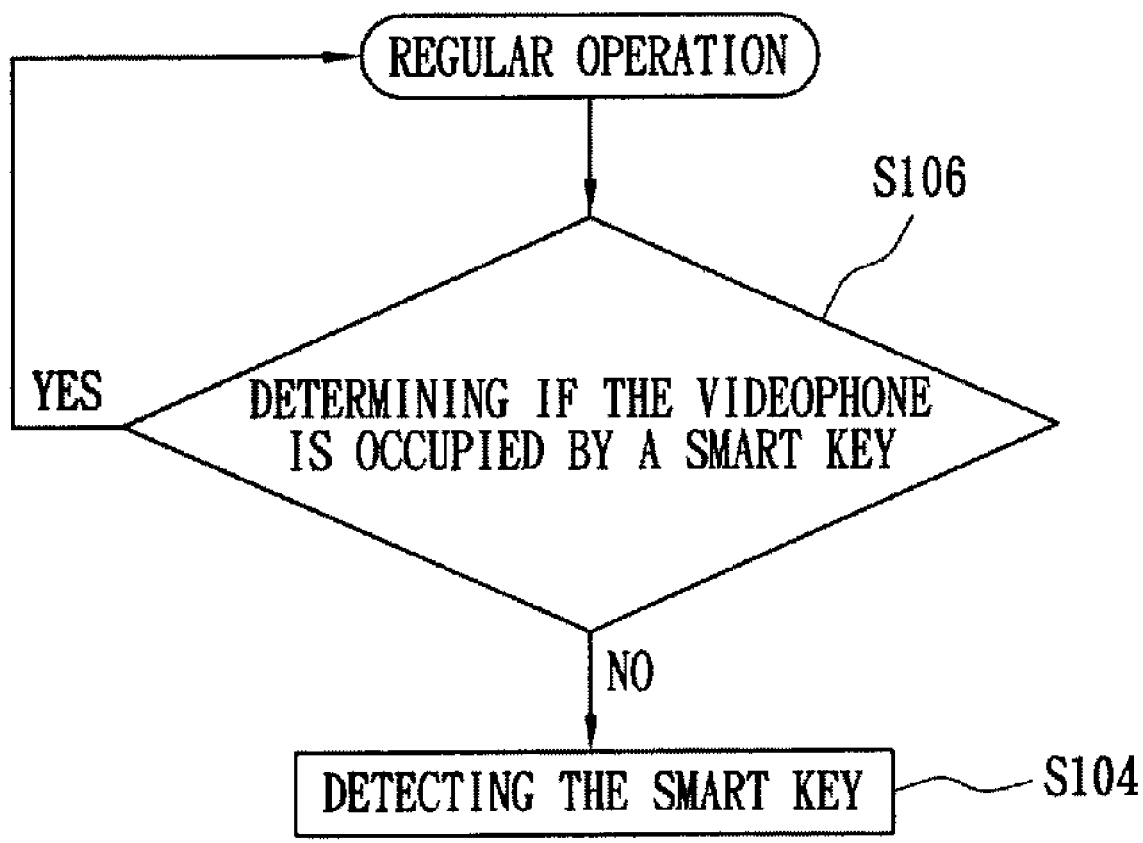

FIG. 4 shows the flowchart of performing the connection procedure (S10) in the hot plug condition. In this condition, the videophone 34 is already on and in standby mode. First, determine if the videophone 34 is occupied by a smart key (S106). If the videophone 34 is occupied, the videophone 34 will stay in standby mode. If the videophone 34 is not occupied, after the first smart key 36 is connected to the videophone 34 by either wired or wireless connection, detection of the smart key (S104) is immediately performed to confirm a proper connection is established.

Figure 5:
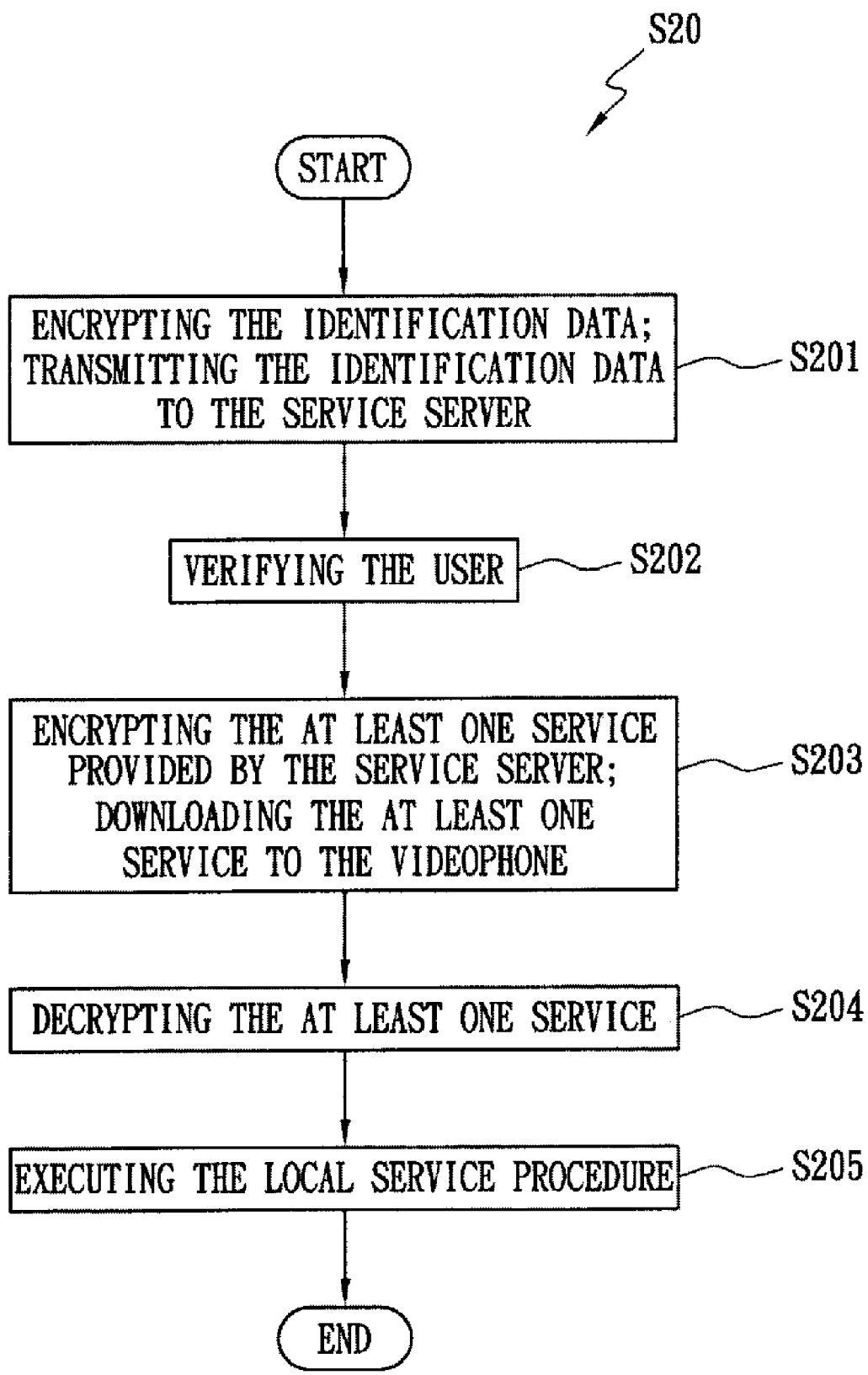
FIG. 5 shows a flowchart of performing a data download procedure.

FIG. 5 shows the detailed flowchart of performing a data download procedure (S20). After the connection between the first smart key 36 and the videophone 34, the user identification data in the first smart key 36 is encrypted with a public key of the service server 31 and the encrypted user identification data is transmitted to the service server 31 (S201). The public key of the service server 31 is retrieved from the key server 32. Then, the service server 31 uses its own private key to verify the encrypted user identification data to confirm the first user (S202). After that, the service server 31 retrieves a public key of the first user from the key server 32 to encrypt the at least one service provided by the service server 31 and then downloads the encrypted at least one service to the videophone 34 (S203). Then, the video-phone 34 uses the first user's private key to decrypt the at least one service. The at least one service includes at least one UI (user-interface) of the first user, at least one piece of user's personal data of the first user and at least one application program of the first user. The UI contains standby screens, icons and ringing melodies, etc. The user's personal data includes a phone book, a call log and phone settings, etc. The application programs include patches, AV codec and customer-made programs, etc. Finally, the local service procedure is executed (S205), which means the at least one service or at least one preloaded application program is executed in the videophone 34. The preloaded application programs are stored beforehand in the smart key 36, but not provided by the service server 31. Additionally, the at least one service may include on-line services like movie-on-demand, conference service, IP phone, Quality of Service, etc., or off-line services downloaded completely to and executed in the videophone 34.

Figure 6:
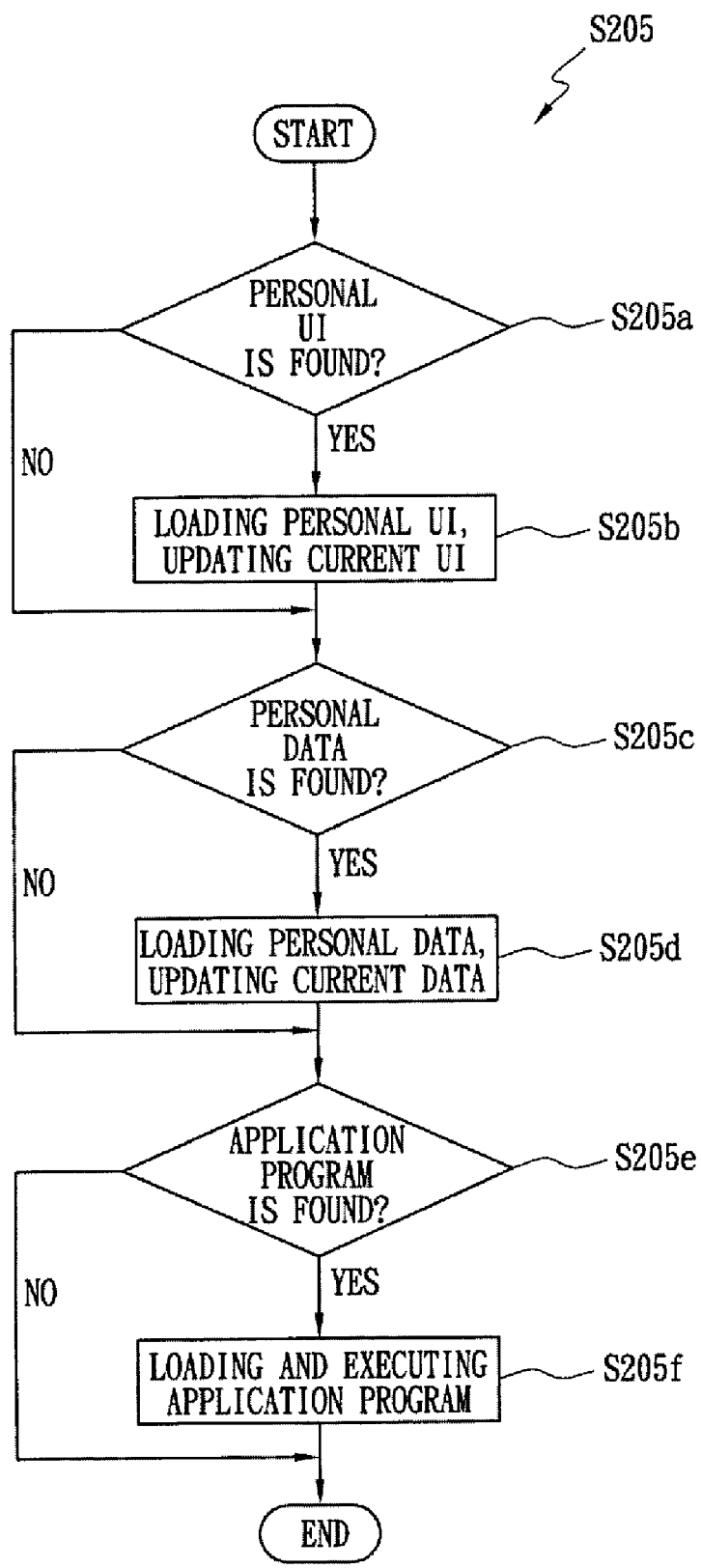
FIG. 6 shows a flowchart of performing a local service procedure.

FIG. 6 shows the flowchart of executing a local service (S205). After the at least one service is downloaded to the videophone 34, the videophone 34 will check if the at least one service contains the personal UI (S205a). If the personal UI is contained, then the personal UI is loaded into the videophone 34 and updates a previous user's UI (S205b). After that, the videophone 34 checks if the at least one service contains the user's personal data (S205c). If the user's personal data is contained, the user's personal data is loaded into the videophone 34 and updates a previous user's personal data (S205d). Then, the videophone 34 checks if the at least one service contains at least one application program (S205e). If the application program is contained, then the application program is loaded and executed (S205f).

Figure 7:
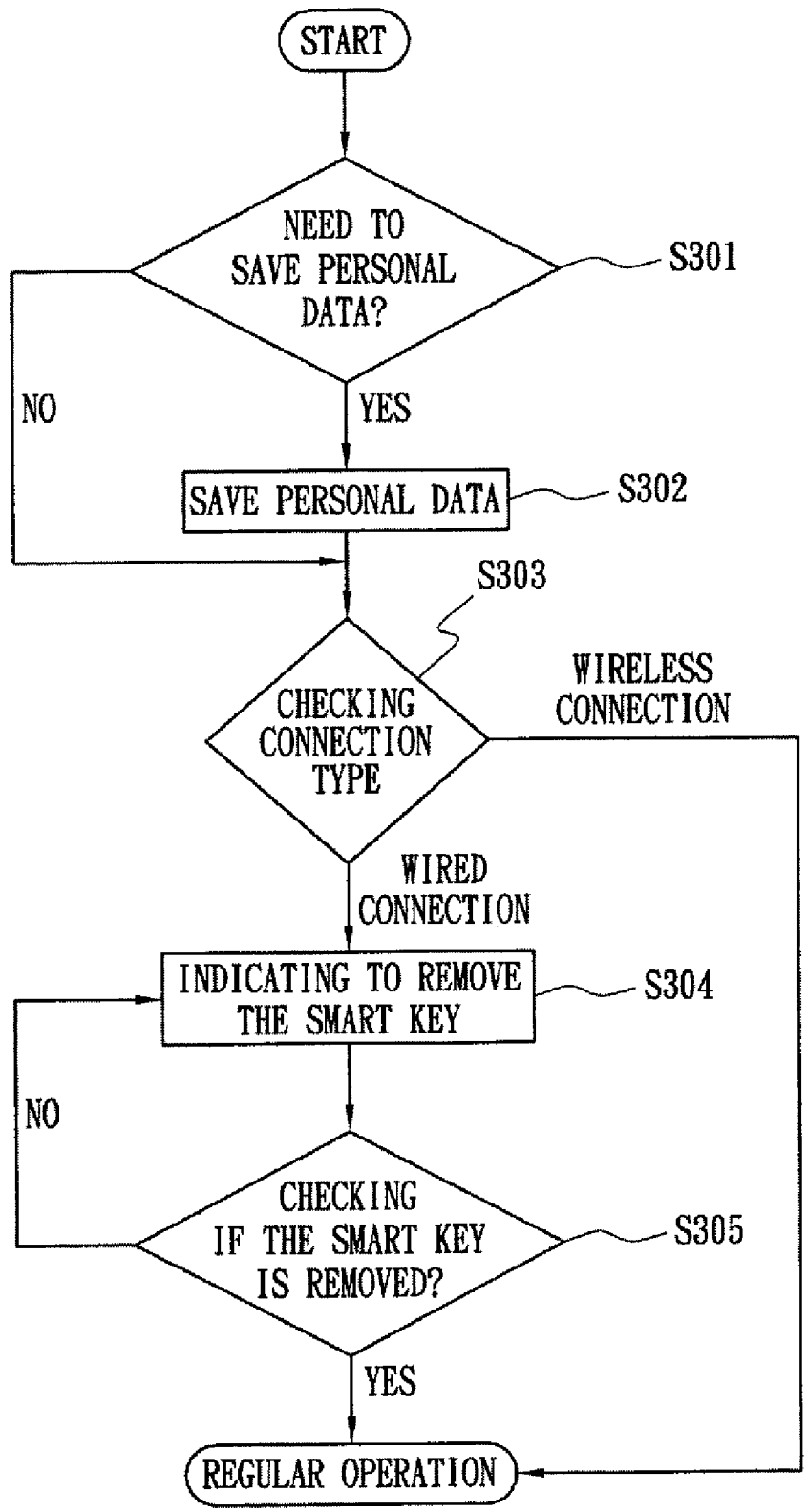
FIGS. 7 and 8 show the flowcharts of performing a disconnection procedure.

When the first user wants to disconnect the first smart key 36 from the videophone 34, a disconnection procedure is performed (S30). FIG. 7 shows the flowchart of the disconnection procedure. The procedure is described as follows. The first user is prompted to save the user's personal data (S301). If the user's personal data is modified and changed, then the user's personal data is saved (S302). After the data saving and before the smart key removing, a check of the connection type is performed (S303). If the wireless connection is used, the videophone 34 turns to its regular operation state. If the wired connection is used, the videophone 34 indicates to remove the first smart key 36 (S304). After that, the videophone 34 checks if the first smart key 36 is removed (S305). If the first smart key 36 is removed, then the videophone 34 turns to its regular operation state.

Figure 8:
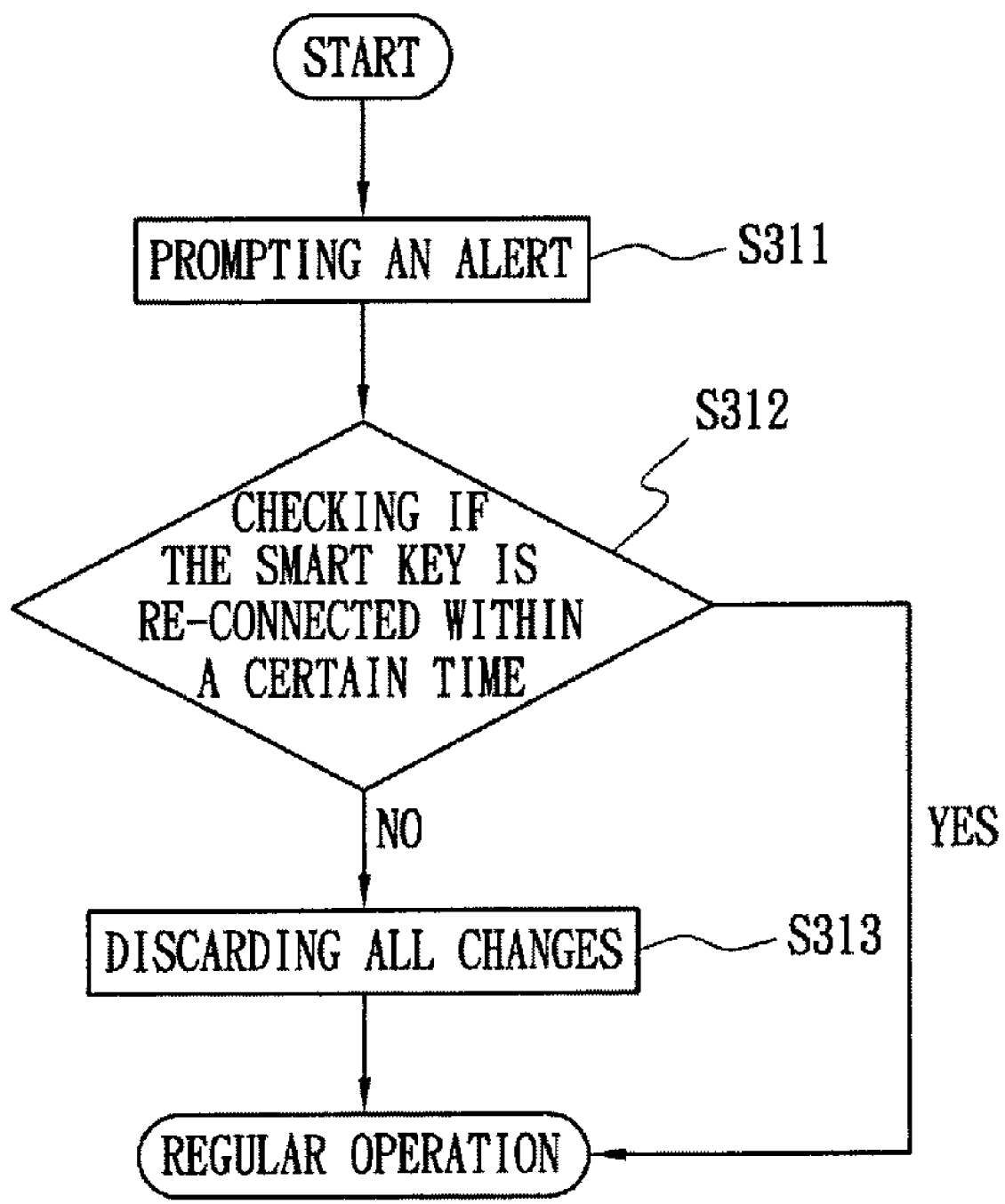

FIG. 8 shows the flowchart of abnormal disconnection. When the first smart key, which is wired type, is removed without following the flowchart in FIG. 7, the videophone 34 prompts an alert (S311) to inform the first user of possible data loss. Then the videophone 34 checks if the first smart key 36 is reconnected within a certain time (S312). If the first smart key 36 is reconnected within a certain time, the videophone 34 turns to its regular operation state, or discards all changes (S313) and turns to its regular operation state.

When a first user and a second user hold a first smart key 36 and a second smart key 37 respectively, they both can communicate AV data with encryption to each other by using public keys, and decrypt AV data with private keys. The following describes the flowchart of encrypted communication by two users with individual smart keys and videophones.

Figure 9:
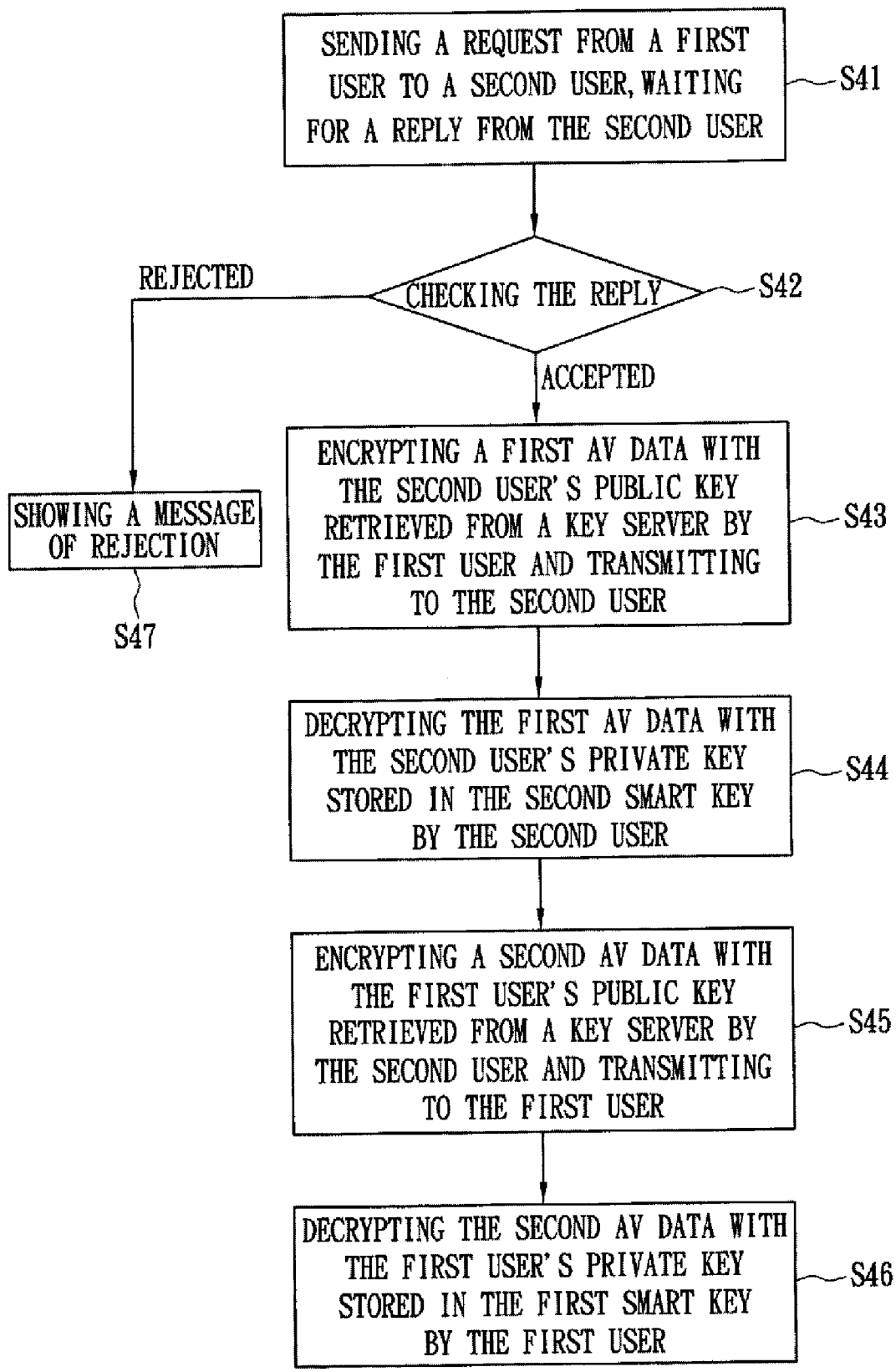
FIG. 9 shows the flowchart of encrypted communication of the present invention.

Referring to FIG. 9, when the connections of smart keys and videophones are established, the first user sends a request to the second user, and waits for the second user's reply (S41). Then, the videophone 34 checks if the reply is accepted or rejected (S42). If the reply is "accepted", the first user encrypts a first AV data with the second user's public key, which is retrieved from a key server 32 and transmits the encrypted first AV data to the second user (S43). After that, the second user decrypts the encrypted first AV data with the second user's private key, which is stored in the second smart key 37 (S44). In the meantime, the second user may encrypt a second AV data with the first user's public key, which is retrieved from a key server 32 and transmits the encrypted second AV data to the first user (S45). Then, the first user decrypts the encrypted second AV data with the first user's private key, which is stored in the first smart key 36 (S46), and after the communication is finished, both videophones 36, 37 turn to their regular operation state. If the reply is "rejected", a message of rejection is shown and the communication stays in a non-encrypted state, and after the communication is finished, both videophones 36, 37 turns to their regular operation state.

The above-described embodiments of the present invention are intended to be illustrative only. Numerous alternative embodiments may be devised by persons skilled in the art without departing from the scope of the following claims.

What is claimed as new and desired to be protected by Letters Patent of the United States is:

1. A method of videophone data transmission, which is executed with a videophone and by a user, the method comprising:
    performing a connection procedure in that a smart key storing at least one user identification data of the user is connected to the videophone, wherein the user identification data at least includes one private key;
    performing a data download procedure, comprising:
    encrypting the at least one user identification data with a public key relevant to a service server in a key server;
    transmitting the at least one user identification data to the service server;
    verifying the user;
    encrypting at least one service provided by the service server;
    downloading the at least one service to the videophone;
    decrypting the at least one service;
    executing the at least one service in the videophone; and
    performing a disconnection procedure in that the smart key is disconnected from the videophone.

2. The method of videophone data transmission of claim 1, which is performed on the Public Key Infrastructure.

3. The method of videophone data transmission of claim 1, wherein the user identification data further includes an identification (ID) code or a password.

4. The method of videophone data transmission of claim 1, wherein the smart key is connected to the videophone through a wired connection, and the wired connection is selected from one of USB, FireWire, Secure Digital or Compact Flash.

5. The method of videophone data transmission of claim 1, wherein the smart key is connected to the videophone through a wireless connection, and the wireless connection is selected from one of Wi-Fi, Bluetooth or Infrared.

6. The method of videophone data transmission of claim 1, wherein when the videophone is off, the connection procedure includes the steps of:
    connecting the smart key to the videophone through a wired connection;
    turning on the videophone; and
    performing a system initialization to reset the parameters of the videophone.

7. The method of videophone data transmission of claim 1, wherein when the videophone is on, the connection procedure includes the steps of:
    connecting the smart key to the videophone;
    restarting the videophone; and
    performing a system initialization to reset the parameters of the videophone.

8. The method of videophone data transmission of claim 1, wherein the connection procedure includes the step of determining whether the smart key is connected to the videophone through wired or wireless connection.

9. The method of videophone data transmission of claim 1, wherein the user is verified by which the service server verifies the at least one user identification data with a private key of the service server.

10. The method of videophone data transmission of claim 1, wherein the at least one service is encrypted with a public key of the user, and the public key is stored in the key server.

11. The method of videophone data transmission of claim 1, wherein the at least one service is encrypted with the private key.

12. The method of videophone data transmission of claim 1, wherein the data download procedure further includes the step of executing at least one preloaded application program in the videophone, and the at least one preloaded application program is stored in the smart key.

13. The method of videophone data transmission of claim 1, wherein the at least one service includes at least one user-interface (UI) of the user, at least one personal data of the user or at least one application program of the user.

14. The method of videophone data transmission of claim 13, wherein the user-interface and the personal data are refreshed.

15. The method of videophone data transmission of claim 13, wherein the use-interface is a standby screen, an icon or a ring melody.

16. The method of videophone data transmission of claim 13, wherein the personal data is a phone book, a call log or a phone setting.

17. The method of videophone data transmission of claim 13, wherein the application program is a patch, an audio-video (AV) codec or customer-made programs.

18. The method of videophone data transmission of claim 13, further including the step of determining if the user logouts normally before performing the disconnection procedure.

* * * * *